(12) United States Patent
Culter (10) Patent No.: US 7,188,331 B2
(45) Date of Patent: Mar. 6, 2007

(54) FIRMWARE DEVELOPMENT WITHIN A FRAMEWORK FROM DIFFERENT DESIGN CENTERS DEPOSITING COMPONENT(S) WITH RELATED CONTEXTUAL AND GENEALOGY INFORMATION IN AN ACCESSIBLE REPOSITORY

(75) Inventor: Bradley G. Culter, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 635 days.

(21) Appl. No.: 10/684,985

(22) Filed: Oct. 14, 2003

(65) Prior Publication Data

US 2004/0268295 A1  Dec. 30, 2004

Related U.S. Application Data

(60) Provisional application No. 60/483,670, filed on Jun. 30, 2003.

(51) Int. Cl.
*G06F 9/44* (2006.01)

(52) U.S. Cl. .............. 717/100; 717/122; 710/104

(58) Field of Classification Search ........... 717/121, 717/122, 123, 100; 716/16; 713/1, 2, 100; 715/961–966; 706/26; 714/104, 36, 38; 707/1, 8, 3, 4, 10, 104.1; 711/163, 159, 156, 711/193

See application file for complete search history.

(56) References Cited

U.S. PATENT DOCUMENTS

| | | | | |
|---|---|---|---|---|
| 5,251,150 A | * | 10/1993 | Ladner et al. ............ 702/127 |
| 5,535,355 A | * | 7/1996 | Scales ........................ 711/101 |
| 5,543,920 A | * | 8/1996 | Collins et al. .............. 356/402 |
| 5,731,973 A | * | 3/1998 | Takaishi et al. .............. 700/56 |
| 5,740,248 A | * | 4/1998 | Fieres et al. ................ 713/156 |
| 5,841,870 A | * | 11/1998 | Fieres et al. ................ 713/156 |
| 5,859,993 A | * | 1/1999 | Snyder ....................... 712/208 |
| 5,996,012 A | * | 11/1999 | Jarriel ........................ 709/226 |
| 6,088,693 A | * | 7/2000 | Van Huben et al. ........... 707/8 |
| 6,164,841 A | * | 12/2000 | Mattson et al. ................ 716/1 |
| 6,304,885 B1 | * | 10/2001 | Savage et al. ............. 715/500 |
| 6,370,635 B2 | * | 4/2002 | Snyder ........................ 712/32 |
| 6,477,683 B1 | * | 11/2002 | Killian et al. .................. 716/1 |
| 6,560,665 B1 | * | 5/2003 | Resler et al. ............... 710/305 |
| 6,735,750 B2 | * | 5/2004 | Korzyniowski et al. ....... 716/5 |
| 6,742,165 B2 | * | 5/2004 | Lev et al. ...................... 716/1 |
| 6,760,888 B2 | * | 7/2004 | Killian et al. .................. 716/1 |
| 6,813,631 B2 | * | 11/2004 | Pouchak et al. ............ 709/203 |

(Continued)

OTHER PUBLICATIONS

Web Management with Microsoft Visual SourceSafe 5.0, Que, Steven Banick et al, 1997, Whole book.*

(Continued)

*Primary Examiner*—Todd Ingberg (57) ABSTRACT

Methods and systems for developing firmware are provided. In certain embodiments, a method comprises defining a framework for firmware to be developed by firmware developers at different design centers. The method further comprises at least one of the firmware developers developing firmware as at least one component within the framework, and depositing the at least one component within a repository that is accessible from all of the design centers, wherein the repository includes contextual information about the at least one component deposited therein.

22 Claims, 4 Drawing Sheets

U.S. PATENT DOCUMENTS

| | | | |
|---|---|---|---|
| 6,839,889 B2 * | 1/2005 | Liu | 716/18 |
| 6,842,883 B2 * | 1/2005 | Whitehill | 716/4 |
| 6,850,252 B1 * | 2/2005 | Hoffberg | 715/716 |
| 6,854,097 B2 * | 2/2005 | Teig et al. | 716/3 |
| 6,857,117 B2 * | 2/2005 | Teig et al. | 716/18 |
| 6,907,482 B2 * | 6/2005 | Maciesowicz | 710/63 |
| 6,912,621 B2 * | 6/2005 | Harris | 711/112 |
| 6,965,816 B2 * | 11/2005 | Walker | 701/16 |
| 6,968,346 B2 * | 11/2005 | Hekmatpour | 707/104.1 |
| 6,971,095 B2 * | 11/2005 | Hirai et al. | 717/173 |
| 6,976,163 B1 * | 12/2005 | Hind et al. | 713/156 |
| 6,990,650 B2 * | 1/2006 | Teig et al. | 716/12 |
| 7,020,854 B2 * | 3/2006 | Killian et al. | 716/1 |
| 7,062,769 B1 * | 6/2006 | Ma et al. | 719/312 |

OTHER PUBLICATIONS

View to Product Configuration Knowledge Modelling and Evolution, Tomi Mannisto et al, 1996, 8 pages.*

UML as Domain Specific Language for the Construction of Knowledge-Based Configuration Systems, Alexander Felfernig et al, Journal of Software Engineering and Knowledge Engineering, 2000, pp. 449-469.*

U.S. Appl. No. 60/483,670, Culter.

INTEL, "Intel Intanium Architecture Software Developer's Manual," vol. 2, System Architecture, Rev. 2.0, Dec. 2001, Document 245318-003, title page, publication page, table of contents and Section 11.1 Firmware Model, pp. 2:253-2:263 provided. (Complete document will be provided upon request). RESUBMISSION.

* cited by examiner

FIRMWARE DEVELOPMENT WITHIN A FRAMEWORK FROM DIFFERENT DESIGN CENTERS DEPOSITING COMPONENT(S) WITH RELATED CONTEXTUAL AND GENEALOGY INFORMATION IN AN ACCESSIBLE REPOSITORY

CROSS-REFERENCE TO RELATED APPLICATIONS

This application claims priority benefit of U.S. Provisional Patent Application No. 60/483,670 entitled: "SYSTEM AND METHOD FOR DEVELOPMENT OF FIRMWARE," filed Jun. 30, 2003, the disclosure of which is hereby incorporated herein by reference.

FIELD OF THE INVENTION

The present invention relates in general to systems and methods for developing firmware.

BACKGROUND OF THE INVENTION

System firmware is often a critical aspect of computer systems. For example, firmware is often developed for a particular hardware device (or configuration of devices) to enable the hardware device(s) to be included in a given platform. System firmware generally has several responsibilities, which, as described further hereafter, may include responsibilities during the boot-up process of a system, as well as during the system's run-time.

The complexity, capacity, and intelligence of computer systems is ever evolving. Often, the rate at which the complexity of a computer system evolves results in difficulty in developing the necessary firmware for the system. For example, as new hardware is developed and/or as new functional capabilities are developed into a hardware device, new firmware is often required for such hardware. System firmware is traditionally system specific, and, as the hardware of a system evolves, new firmware that is very specific to the evolved hardware is developed. Further, firmware is typically very difficult to write. It generally does not have a rich development environment, debuggers, or an integrated development environment, such as is available for developing user-level (non-privileged) application software such as databases, word-processors and video games, as examples. And, individuals skilled at developing system firmware are rare.

Often a desire exists for rapidly evolving a system. This results in a need to rapidly produce firmware for the evolved system, but a relatively small number of people may be available within a business for developing the needed firmware. Accordingly, a need exists for a system and method for efficiently developing system firmware.

BRIEF SUMMARY OF THE INVENTION

According to certain embodiments of the present invention, a method for developing firmware is provided. The method comprises defining a framework for firmware to be developed by firmware developers at different design centers. The method further comprises at least one of the firmware developers developing firmware as at least one component within the framework, and depositing the at least one component within a repository that is accessible from all of the design centers, wherein the repository includes contextual information about the at least one component deposited therein.

In certain embodiments, a business method for development of firmware across a plurality of design centers is provided. The business method comprises defining a framework for firmware to be developed at different design centers. The business method further comprises developing firmware as components within the framework at at least some of the design centers, and depositing the components within a repository that is accessible by all of the design centers, wherein the repository includes contextual information about the components deposited therein.

In certain embodiments, a system comprises a plurality of different design centers communicatively coupled by a communication network to a repository. The repository is accessible by firmware developers of the design centers, wherein the repository stores firmware components and contextual information for the firmware components.

DETAILED DESCRIPTION OF THE INVENTION

Embodiments of the present invention are now described with reference to the above figures. An embodiment of the present invention enables synergistic collaboration of firmware development within an organization such that server products can simultaneously and easily evolve in two dimensions, which improves both return-on-investment for the organization and product quality. That is, reuse of firmware is enabled not only across one product line (i.e., one dimension), but reuse is also enabled across different product lines and/or across different design centers (i.e., two dimension). A new, loosely coupled component-based internal firmware architecture and a new development model are provided. An approach of an embodiment offers business managers the tools to dynamically balance the interplay of business technological and social forces that may be present within the organization.

More specifically, an embodiment of the present invention includes: 1) using a framework and components model for firmware development, wherein a firmware framework is defined and components may be developed/added within the framework to develop various different firmware implementations; 2) using a cooperative social architecture for the firmware development; and 3) implementing an asset repository to which members of the cooperative have access to assets therein. Each of these features of an embodiment of the present invention are described in further detail below.

In accordance with the framework and component architecture, a framework is defined and firmware developers may develop firmware as components to the framework. That is, within the defined framework, various components may be developed and selected for inclusion within a given implementation in order to develop many different firmware solutions.

In accordance with the cooperative social architecture, the firmware developers may "join" the cooperative, whereby the developers agree to abide by certain rules of the cooperative and are allowed access to retrieve and submit firmware components to the cooperative. An asset repository is maintained for the cooperative, in which the firmware components (or assets) of the cooperative are stored. Members of the cooperative are allowed access to the asset repository. The cooperative architecture enables members of the cooperative to reuse components stored in the asset repository, but does not prohibit members of the cooperative from autonomously evolving such a component. For instance, a member developer may retrieve a firmware component from the asset repository and may evolve such firmware component to efficiently develop a new firmware component (e.g., for a new hardware element). Thereafter, the member developer may contribute the newly developed firmware component (which evolved from the firmware component retrieved from the asset repository) to the asset repository. Thus, the cooperative social architecture may be utilized for developing firmware code as components such that each component is stored as an asset in the asset repository.

In one embodiment of the present invention, the asset repository includes content and context. The content portion of the asset repository is the actual components (i.e., firmware code). The context portion is maintained by the asset repository and identifies the genealogy of the assets contained therein. For instance, a context identifies different versions and other relationships between the various assets stored in the repository.

Figure 1:
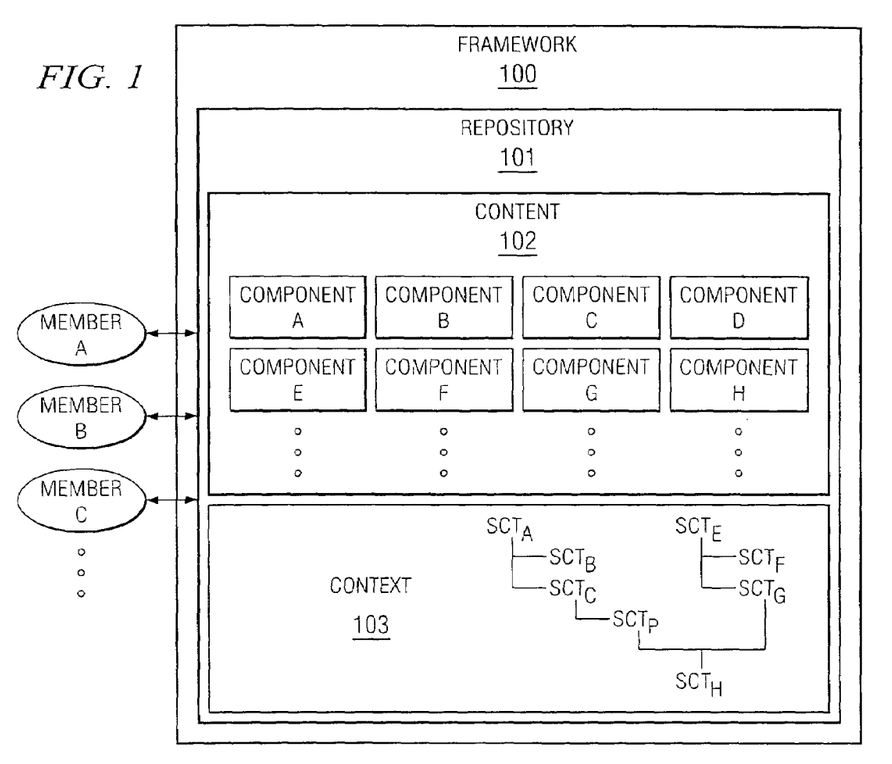
FIG. 1 shows an example block diagram illustrating an embodiment of the present invention.

Turning to FIG. 1, an example block diagram illustrating an embodiment of the present invention is shown. As shown, a framework 100 is defined for firmware that is to be developed by members of a cooperative, such as members A, B, and C of FIG. 1. The members may develop firmware source code as components within the framework 100. That is, the members may develop components that comply with the defined firmware framework 100. A repository 101 is provided in which both content 102 and context 103 may be stored. For instance, developed components, such as components A–H shown in FIG. 1, may be stored as content 102 within repository 101. Context 103 provides information about the stored content 102, such as the relationships between components A–H stored in content 102.

In certain embodiments, repository 101 may be physically distributed across a plurality of geographies. For instance, with the example of FIG. 4 described below, repository 101 may, in certain implementations, be distributed across design centers A–C, thus providing a distributed 'multi-image' repository that are inter-linked and consistent. This model helps the autonomy of different design centers, while preserving the 'global library view' of all assets from any one developer's workstation. In other embodiments, a 'single image' repository may be implemented that is accessible by the various members of the cooperative.

Embodiments of the present invention do not prohibit members of the cooperative from using assets (e.g., components) available in repository 101 for autonomous development of their products. For instance, members of the cooperative may use an asset from repository 101 and further modify or develop the asset in a manner that is not consistent with the framework defined for the cooperative. In this manner, membership in the cooperative does not prohibit a developer from being able to pursue development of his/her product line independent of the progression of the cooperative. Of course, to the extent that the further development to an asset made by a member of the cooperative is consistent with the framework defined for the cooperative, the member may deposit the resulting developed asset in repository 10 for the benefit of other members of the cooperative. Context 103 of repository 101 provides helpful information regarding the relationship of the components to each other, such as identification of a component from which another component was developed or evolved.

Software is typically developed in an environment that stores the source files whose contents are often ASCII encoded text files in the hierarchically organized file storage structures employed by common operating system environments such as Windows™ and Unix™. It is normal for developers to refer to the aggregate of these files that comprise a single product as the "source tree" for that product. These source trees are also preserved through their various evolved iterations as engineers edit and change individual lines of code and documentation in individual files within the source tree. It is desirable, during development and product support, to be able to reconstitute any previous set of file versions. Various approaches to managing these version controlled file-sets exist. Some are built-in to the operating system filesystem (e.g., CLEARCASE™ by Rationale) and others are layered on top of standard operating system file storage with a set of collaborative programs, (e.g., Concurrent Versions of Systems, a.k.a. CVS, is an open-source tool that functions in this way.) Collectively, these are usually called Configuration Management, or CM tools. So it is said (by a developer) that their software is stored in a source tree whose iterative versions are maintained in a CM or version-control system. Repository 101 may maintain many different sets of CM file-sets. Accordingly, it provides mechanisms to trace the stemma (or software genealogy) of source files that are reused and evolve across different family trees.

In the example of FIG. 1, context 103 shows the relationships of the source trees for components A–H. For instance, the source tree for component A ($SCT_A$) and the source tree for component B ($SCT_B$) are shown as being related. More specifically, $SCT_B$ is shown as being developed from (or based on) $SCT_A$. Thus, for instance, a developer may have used $SCT_A$ and modified it in some manner to result in $SCT_B$. Likewise, $SCT_C$ is shown as being developed from (or based on) $SCT_A$. Further, $SCT_D$ is shown as being developed from $SCT_C$. Also, $SCT_E$ is shown, with $SCT_F$ and $SCT_G$ each being developed therefrom. And, $SCT_H$ is shown as being developed from both $SCT_D$ and $SCT_G$. That is, a developer may have taken portions from each of $SCT_D$ and $SCT_G$ and combined/modified those portions to result in $SCT_H$.

In view of the above, in certain embodiments of the present invention, the contextual information 103 may include genealogy information the firmware components of content 102. For instance, if one component was derived from one or more other components, the contextual information may identify the one or more other components from which the component was derived. In certain embodiments, various other information may be included in the context 103 for a firmware component, including without limitation:

(a) identification of the platform(s) in which this component and/or its relatives have been deployed;

(b) explanation of reasons the component evolved;

(c) explanation of problems and solutions for its evolution;

(d) references to inventions that the component embodies;

(e) 'health factor' of the component, which may be a simple metric reflecting how much 'quality' the component is believed to embody (this may reflect, for example, how thoroughly the component has been tested);

(f) process recipes for how to test or validate the component as a unit or within a system; and (g) identification of author(s) and reusers of the component and its relatives (e.g., offspring).

It should be recognized that much of the information included in the context 103 may be provided by developers (e.g., authors or reusers of a component).

Figure 2:
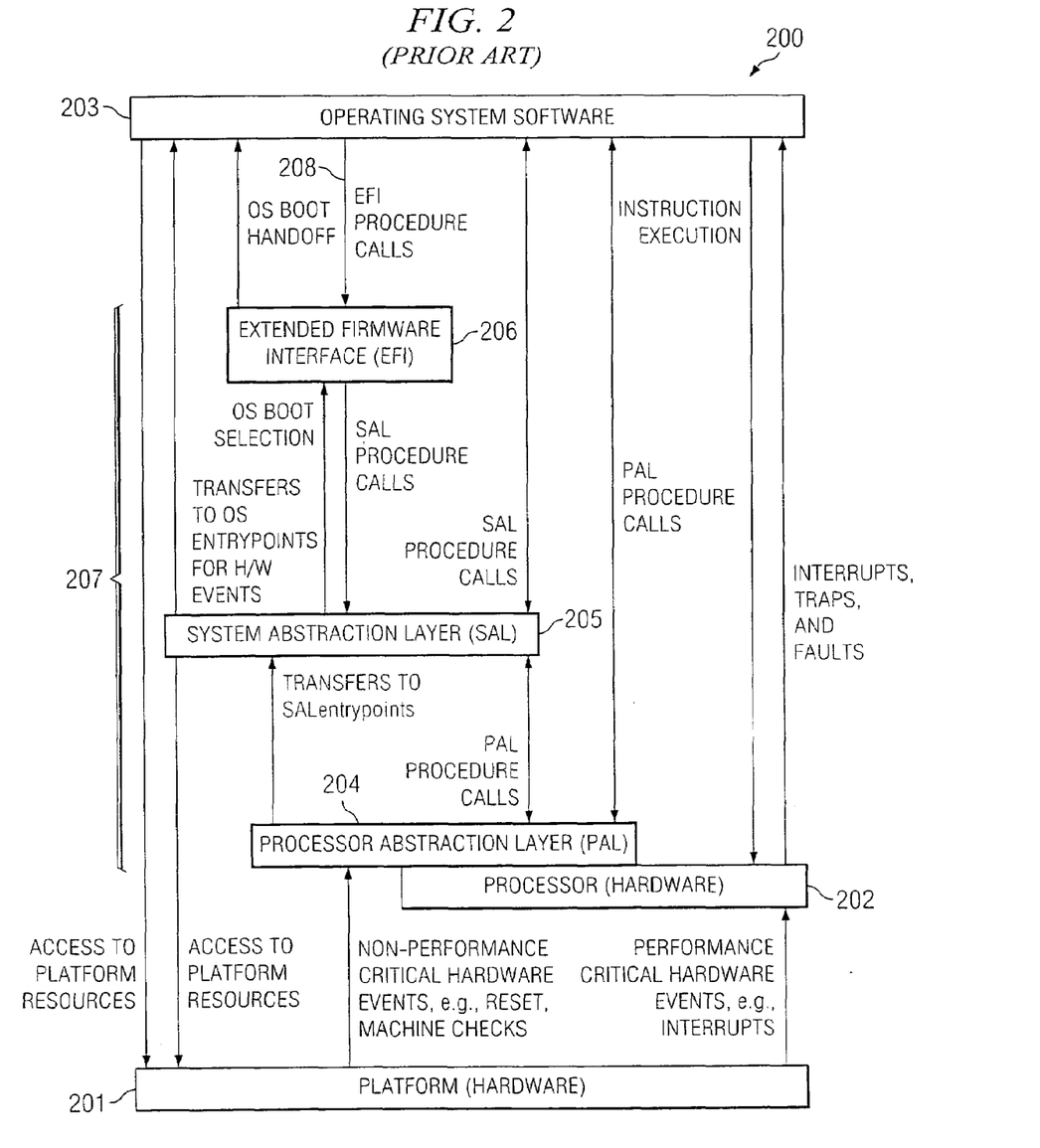
FIG. 2 shows an abstract model of an example system in which an embodiment of the present invention may be utilized.

An example implementation of an embodiment of the present invention is described further below in conjunction with FIGS. 2–3. FIG. 2 shows an abstract model of an example system 200, which comprises hardware platform 201, processor(s) 202, Operating System ("OS") 203, and system firmware 207. In this example implementation, system firmware 207 comprises a Processor Abstraction Layer (PAL) 204, System Abstraction Layer (SAL) 205, and Extended Firmware Interface (EFI) 206.

Various processor architectures are known in the art, such as the PA-RISC family of processors developed by HEWLETT-PACKARD Company ("HP"), INTEL Corporation's (INTEL) architecture (IA) processors (e.g., the well-known IA-32 and IA-64 processors), and the like. As is well-known, IA-64 is a 64-bit processor architecture co-developed by HP and INTEL, which is based on Explicitly Parallel Instruction Computing (EPIC).

The example system 200 shown in FIG. 2 follows the well-known IA-64 architecture, such as is implemented for the well-known ITANIUM Processor Family (IPF). While embodiments of the present invention may be implemented within any other suitable system architectures for which firmware may be desired (and therefore are not limited solely to the IA-64 architecture shown in FIG. 2), a preferred embodiment of the present invention is described hereafter as being implemented for developing firmware for use within the IA-64 (e.g., IPF) system architecture of FIG. 2. The IA-64 processor architecture definition specifies requirements for firmware architecture elements of systems utilizing IA-64 processors. The quintessential model of this architecture is given in the *Intel IA-64 Architecture Software Developer's Manual Volume* 2: *IA-64 System Architecture*, in section 11.1 Firmware Model. It describes that the IA-64 firmware comprises three major components: PAL 204, SAL 205, and EFI 206, which together provide the processor and system initialization for an OS boot. The three components 204, 205, and 206 may not represent all of the required system firmware functionality for certain IA-64 computer systems, but further firmware may also be included.

Hardware platform 201 represents the collection of all of the hardware components of system 200, other than the system's processors 202. The arrows shown in the abstract model of FIG. 2 between these various components indicate the types of permitted interactions for the behavior of system 200. When system 200 is first powered on, there are some sanity checks (e.g., power on self-test) that are performed by microprocessors included in platform 201, which are not the main system processors 202 that run applications. After those checks have passed, then power and clocks are provided to processor 202. Processor 202 begins executing code out of the system's ROM (not specifically shown in FIG. 2). The code that executes is the PAL 204, which gets control of system 200. PAL 204 executes to acquire all of the processors 202 such that the processors begin executing concurrently through the same firmware.

After it has performed its duty of initializing the processor(s) 202, PAL 204 passes control of system 200 to SAL 205. It is the responsibility of SAL 205 to discover what hardware is present on platform 201, and initialize it to make it available for the OS 203, primarily main memory. When main memory is initialized and functional, the firmware 207 (i.e., PAL 204, SAL 205, and EFI 206, which is not running yet) is copied into the main memory. Then, control is passed to EFI 206, which is responsible for activating boot devices, which typically includes the disk. EFI 206 reads the disk to load a program into memory, typically referred to as an operating system loader. EFI 206 loads the OS loader into memory, and then passes it control of system 200 by branching one of the processors 202 (typically called the boot startup processor) into the entry point of such OS loader program.

The OS loader program then uses the standard firmware interfaces 207 to discover and initialize system 200 further for control. One of the things that the OS loader typically has to do in a multi-processor system is to retrieve control of the other processors. For instance, at this point in a multi-processor system, the other processors may be executing in do-nothing loops. In an Advanced Configuration and Power Management Interface ("ACPI")-compatible system, OS 203 makes ACPI calls to parse the ACPI tables to discover the other processors of a multi-processor system 200. Then, OS 203 uses the firmware interfaces 207 to cause those discovered processors to branch into the operating system code. At that point, OS 203 controls all of the processors and the firmware 207 is no longer in control of system 203.

As OS 203 is initializing, it has to discover from the firmware 207 what hardware is present at boot time. And in the ACPI standards, it also discovers what hardware is present or added or removed at run-time. In discovering hardware that may be present in an ACPI-compatible system, OS 203 accesses the system's ACPI table(s). The OS uses function calls during the system initialization to find out the address of the ACPI tables. A pointer to those ACPI tables is passed in the EFI system table pointer, which is obtained by making one of the standard EFI procedure calls 208 in FIG. 2. So, EFI procedure calls 208 are used to pass the address of the ACPI tables which describe the hardware of system 200. Such ACPI tables that OS 203 accesses at boot time describe the resources available to system 200.

Much firmware is developed (e.g., for certain devices, such as laser printers, etc.), wherein the firmware comprises a dedicated real-time operating system. System firmware typically does not include its own dedicated OS, but instead turns over control of the hardware to the system's OS. This increases the complexity of developing system firmware. As a specific example, suppose system firmware is implemented for a real-time OS, as soon as the system firmware turns over control to the system's OS, the firmware no longer has an interval timer because the OS needs the interval timer. So, all of the scheduling mechanisms to operate the firmware that need the interval timer (e.g., for a scheduling mechanism) may fail during the system's run-time because firmware does not have ownership of the interval timer. So, the firmware essentially has to be developed to work in two kinds of completely different systems: 1) system boot-time in which the firmware initializes the system and hands over control to the system's OS, and 2) at system run-time when the system's OS has control of the system.

Thus, a framework for the firmware may be defined to which components can be attached, and this framework may need to comply with some other framework, such as an operating system environment. As described above, at boot-time there is no system operating system (until it is loaded and given control by the firmware). So, at boot-up the system firmware is running in one kind of environment. Then, at system run-time the system firmware is in a different environment. It is desirable for the system firmware to be compatible with both environments. So, an embodiment of the present invention combines a framework and component model that meets those constraints with a database model that represents explicitly the components as they are aggregated together.

Figure 3:
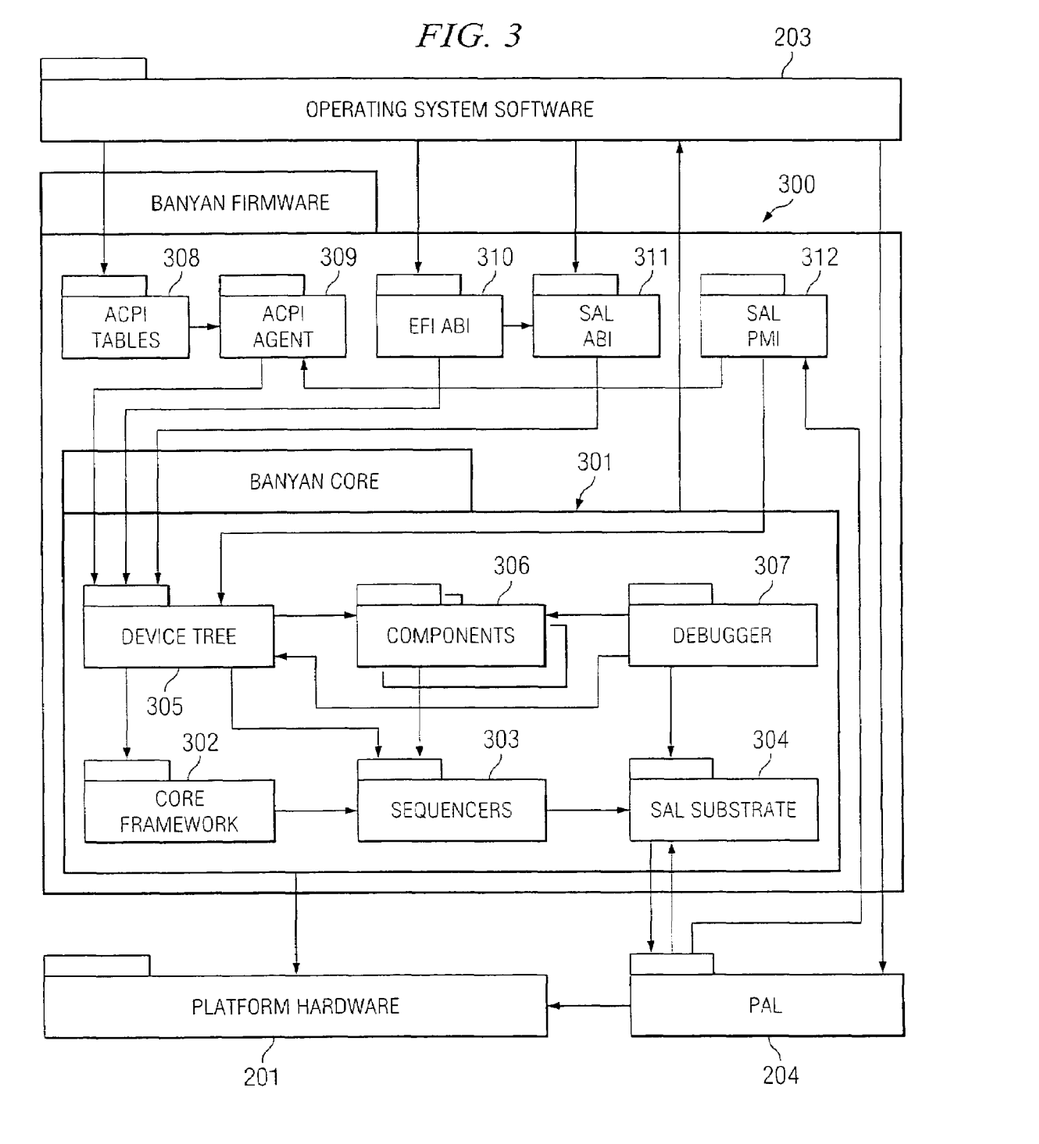
FIG. 3 shows an example of an embodiment of the present invention that is implemented within the well-known IA-64 architecture.

An example of an embodiment of the present invention that is implemented within the above IA-64 architecture of FIG. 2 is shown in FIG. 3. Such example embodiment of the architecture is referred to as Banyan architecture herein, and an embodiment of the development model (or social cooperative) used within this architecture is referred to as the Banyan Firmware Cooperative herein. Further, the explicit artifacts (or asset repository) of this embodiment of the development model are referred to as the Explicit Reference Model. The Banyan architecture, Banyan Firmware Cooperative, and Explicit Reference Model are designed to work together to create sustainable synergy.

FIG. 3 shows an example block diagram of the Banyan architecture. The Banyan architecture 300 is an application of a Framework plus Components model. In general, a framework is a domain-specific set of software functionality that comprises the major body of the system functionality. Components interact collaboratively with the framework and each other via clearly defined interfaces to achieve the overall system function. Frameworks are generally hard to develop, hard to learn, and are domain specific. However, if they are very well done, they are also the best means to achieve the highest levels of reusability.

The Framework plus Components model is appropriate for implementing firmware for an evolving computer server product family because the system's hardware will more often vary by individual components rather than every component as it evolves from generation to generation (1st dimension) or across product families (2nd dimension). That is, the hardware that needs firmware will change, but much of the functionality of the system needs to stay the same. So, much of the system firmware's functionality, such as the coordination of the elements, the discovery of hardware, matching the firmware to the discovered hardware either at boot time or when the hardware is activated, etc., may be implemented in the framework, such that much of the firmware is reusable across different components, and hardware-specific portions of the firmware may be implemented as components in the Framework Plus Components Model.

Each element of this example Banyan architecture 300 is described as follows:

(1) ACPI Tables 308: ACPI tables 308 are well-known tables for describing resources of an ACPI-compatible system to its OS.

(2) ACPI Agent 309: ACPI Agent 309 is responsible for exporting ACPI (standard) firmware functionality. In this model, it is code that is given control during bootstrap, after the core 301 is initialized, during which it converts the representations of the system used internally to those required by the external standards. It is similar to a proxy design pattern in that it separates evolution of the ACPI interface from those employed internally to describe the system and to control some hardware functions.

(3) EFI ABI 310: EFI ABI 310 is the IA-64 standard set of external interfaces (procedure call based) that provides boot services to the OS loader and early OS initialization code. It also contains a very minimal set of runtime services that are available even after the OS is given full control and when the boot-time services become unavailable. The EFI package may also contain an EFI-boot-driver runtime infrastructure to support standard EFI boot drives.

(4) SAL ABI 311: This veneer (another Adapter Pattern) implements the standard IA-64 firmware procedure interfaces required by the IA-64 architecture. It also implements the OEM-specific procedures for product differentiation functions. Internally, there may be separation of OEM specific functionality into a sub-package or separate component(s).

(5) SAL PMI 312: Platform Management Interrupt (PMI) is a mechanism that the processor provides to enable functional extensions that do not require operating system support or new firmware interfaces. Typically, such functionality would be implemented with a combination of specialized hardware with firmware assist. Thus, there typically is a mechanism to trigger the firmware assist that is built into the processor and supported by PAL. The SAL PMI adapter is similar to ACPI Agent 309, EFI ABI 310, SAL ABI 311 in that the program image is instantiated as a separate program entity into main memory by the sequencer. However, it differs from these others which provide an interface between operating system software and firmware. Instead the SAL PMI provides an interface between PAL and SAL. The PMI interruption is a hardware event which is architecturally handled by SAL (from PAL's perspective), but in this modular Banyan system, is best implemented as program separate from SAL, layered "on top" of the Banyan core just as the other memory-resident adapters.

(6) Portable Core (or "database") 301: This is a multi-package package, implementing a number of capabilities. A complete, dynamic description of the system hardware configuration is maintained in a subsystem that implements the "Device Tree" architectural pattern 305. Core I/O drivers, such as console, for bootstrapping the framework are part of this package as are remote console protocols, debugger support 307, system initialization coordination, error handling coordination, and essentially most of the firmware system functions that can be made portable.

The elements of the core 301 are described more fully as follows:

(a) Device Tree 305: The Banyan Component Tree package which is a dynamic system of bound-components representing the system platform hardware and software components. Device Tree 305 corresponds to the repository 101 of FIG. 1 with its "tree" being the context 103, and components 306 correspond to content 102 of FIG. 1.

(b) Tree Components 306: This represents the aggregation of loosely coupled binary images of components available for instantiating into the device tree 305. Some are "software packages" representing sharable services such as network protocols, buffer caching, et., and others are "hardware packages" that implement "device nodes" in the tree that correspond to actual system hardware components. The instantiated components reside in the component tree that is constructed at boot time. As mentioned above, tree components 306 correspond to content 102 of repository 101 of FIG. 1.

(c) Debugger 307: This package represents an interactive debugger function that supports both local and remote models of debugging. The remote model can be connected through any supported device (typically a serial or LAN connection). The local debugger is expected to be used through a direct link connection. Local debugging may not support source level debugging because required symbol tables may not be available. The debugger package is expected to be composed of several Banyan components.

(d) Core Framework 302: The supporting services that include memory management, primitive console etc., that support the device tree package 305, but which are better collected outside of that package for modularity purposes. The major "component binding" and "component framework" infrastructure en-or handling infrastructure, and "OS-like" infrastructure (locking primitives, lock tracing, event logging, etc. may be implemented here).

(e) Event Sequencer 303: The two primary kinds of events that require sequencing include initialization events and error handling events. This package does not represent a centralized handling mechanism; rather we think of this as a "conductor" of an "orchestra" of different musicians. Each musician knows how to play its own instrument (init, handle error) but not the score of the entire symphony. The conductor knows the score, but not how to play each instrument. Sequencer 303, like the conductor, serves as "coordinator". This provides the benefits of both a distributed error handling system and a centralized error handling system without the detriments.

(f) SAL Substrate 304: This package represents the SAL_ENTRY functionality that must match the PAL requirements. It also contains some platform-dependent fabric initialization primitives and error handling framework. There is also a set of platform-independent functionality that is or may be processor instruction set dependent. Processor model-dependent code can be implemented in this substrate package or in the component that corresponds to the processor (or a combination of both). SAL_Substrate also exports services to other packages and component tree components.

While an example implementation of an embodiment of the present invention is shown in FIG. 3 as being implemented within the IA-64 architectural framework, embodiments of the present invention may be implemented for various other frameworks, including frameworks for other general-purpose processor architectures such as PA-RISC, IA-32, MIPS, SPARC, a 64-bit AMD OPTERON™ architecture, and ALPHA, as examples. In such implementations, the ABI layers may differ from that described above with FIG. 3, but the core, the cooperative social model, and the repository tools may be included therein in much the same manner as described with FIGS. 1 and 3 above.

Firmware source code is the primary asset that firmware teams create. By implementing an embodiment of the present invention, it is possible to increase the value of the asset base without the need to dramatically increase development resources. More specifically, by implementing a system and development methodology in which firmware code is reusable, the efficiency of the developers may be increased.

Suppose that within an organization, there exist multiple different design centers for developing systems, where each design center has firmware developers for developing the firmware code for their center's respective system. For instance, an organization may have the following four design centers: 1) workstation, 2) low-end, 3) midrange, and 4) high-end. Any new model of software architecture that maximizes reuse preferably does not also force designers to make trade-offs that diminish their product value. That is, it is desirable for the new software architecture to explicitly support all design centers equally.

To date, the most common collaboration among system firmware development teams has been primitive reuse-by copying and porting source files. Other attempts at higher-level reuse have tended to fall apart due to the need for the autonomous development by each design center. For instance, different design centers may have different time constraints (e.g., product release dates, etc.) and/or other constraints on their development such that they need to be capable of autonomously controlling their development progression. To clarify, it is desirable for the firmware development model to be product-centric in that it maximizes freedom of choice of separate firmware development teams to evolve their products as they see fit while maintaining maximum reuse. This may be stated as the desire for the reuse model to value (i.e., explicitly support) autonomy.

A well-known principle of software engineering, often called Conway's Law, states that the structure of the software system will always mirror the structure of the organization that created it. Therefore, to succeed at establishing sustainable synergy among multiple firmware development teams, building firmware for separate hardware systems, the development model preferably balances the technical and social forces underlying Conway's Law. The social forces in the new organizational model may be designed so that a natural equilibrium of the structure of the organization actually mirrors the software structure. This may be stated as the desire for the organizational architecture to mirror the software architecture.

An embodiment of a firmware development model, such as the example Banyan model described above, comprises three overlapping models that cover the technical and social dimensions of the system so as to maximize flexibility, as follows: 1) Architecture, 2) Process, and 3) organization. Each of these models are described further below.

Architecture involves creating new models out of thin air or by evolving existing models into completely new ones. The most distinguishing characteristic of a new model is that no one except the creator can have experience with the model until it is shared. To implement a new model, many people will have to develop a shared experience with the model. The problem of developing a new model involves a good bit of structuring. But the problem of deploying the model involves even more communication. The architect(s) can do this best by making as many explicit representations of the model as can be afforded. It is also the responsibility of the architects to verify the implementers have accurately internalized the model so that real systems accurately deploy the model. Example explicit representations (e.g., documents) that may be used for communicating a new module, such as the example Banyan architecture, include the following:

Team Values. The model's architects may agree to explicit team values that will be used to guide their work together, and form a backdrop for the entire process of evolving and deploying products using the model.

Architectural Principles. In the presence of uncertainty, sometimes the adoption of shared principles is the most direct means that a team can empower its members to work concurrently on different tasks autonomously, and yet make consistent decisions. Thus, architectural principles may be defined to be used to guide the architectural choices.

Key Concepts. In any new model there are a number of key concepts that underlie that model. Rather than representing these key concepts in an ad-hoc fashion, or implicitly in other architectural work products, key concept documents may be created. These serve to help engineers deploy and extend the architecture as well as provide training material in the future for new cooperative members of the architecture.

Architectural Glossary. Key technology that requires definition or clarification but does not require a more detailed concept document treatment may be captured in this document.

Structuring Documents. The structuring documents include the standard software architectural work products such as Architectural Reference Specifications and Requirements Specifications. To these several more explicit views of the new architectural model may be included, such as graphical models of the logical, physical, process and functional viewpoints of the model.

Prototypes. One of the best ways to communicate software functionality to a software engineer is to use their language of expression: source code. To this end, the architects (with the help of deployment engineers) may create a number of prototypes of portions of the architecture.

Process Documents. These documents describe the architects' vision of the processes and practices that serve to aid in evolving the architecture (and the products developed therefrom) while keeping collaboration strong.

Slide Presentations. Various slide presentations to help communicate the architectural model more effectively may be created or borrowed and published along with all other artifacts.

Other Documents. There are other technical concepts, practices and theories that may be underlying the architecture. Any that aids in conveying the architectural model more fully to the organization may also be included as part of the explicit representation of the architecture.

While the primary purpose of the new architectural model for developing firmware in accordance with embodiments of the present invention, such as the Banyan architecture described above, is to help developers create system firmware rather than documents describing the model, to aid collaboration among geographically dispersed development teams, certain reference materials may be helpful. The Explicit Reference Model (ERM) of an embodiment comprises a shared asset base that contains several explicit work products that facilitate collaboration among deployment teams. As described further below, the ERM is not just source code.

As mentioned above with FIG. 1, in one embodiment the Explicit Reference Model (or "repository") comprises two parts: the contents (or "asset base") and the context. The content comprises the explicit work products created by architects and engineers, including the source code of firmware components, such as the components of the example Banyan architecture of FIG. 3. The context illustrates the relationship between the components of the content, which may assist platform teams in selecting components to use in developing firmware for deploying their products. As teams use a first component available in the content and modify and/or add to it to develop firmware (i.e., a second component) suitable for their needs, the developed second component may be added back to the content and the context will show that this team helped to evolve the content by contributing the second component having a relationship with the first component from which it was developed. Thus, the context provides a process view.

In one embodiment, the content (or "asset base") of the repository is a web-based shared repository of documents, source code, and programs. It may serve as both a teaching tool and a deployment tool. Engineers can look at the contents of the repository to see how similar problems have been solved by others working on different systems. They can consult the asset base to see actual deployments for platforms. They can draw functioning sources of firmware components, test programs and tools in order to help create their own systems.

In one embodiment, any member of the cooperative can modify any component in the repository to suit the needs of their platform. This policy ensures autonomy. If the modified component is re-deposited into the repository, it becomes available to others for use. The member that developed a component is assumed to know the most about it and is said to be the "master of" or sometimes to "own" the component. But like all co-operatives, ownership is actually shared. What is meant by ownership of a component in this sense is that the master/owner is expected to support the component as a consultant to other co-op members who reuse that component in their platform. Ownership is an informal concept and it transfers whenever someone has modified a component enough that the former owner is no longer the expert. A developer is free not to deposit a modified component. The developer can simply use it in his/her product. However, taking from the cooperative without giving something back in return is not fair. It violates the spirit of a cooperative. Although, autonomy allows it.

Figure 4:
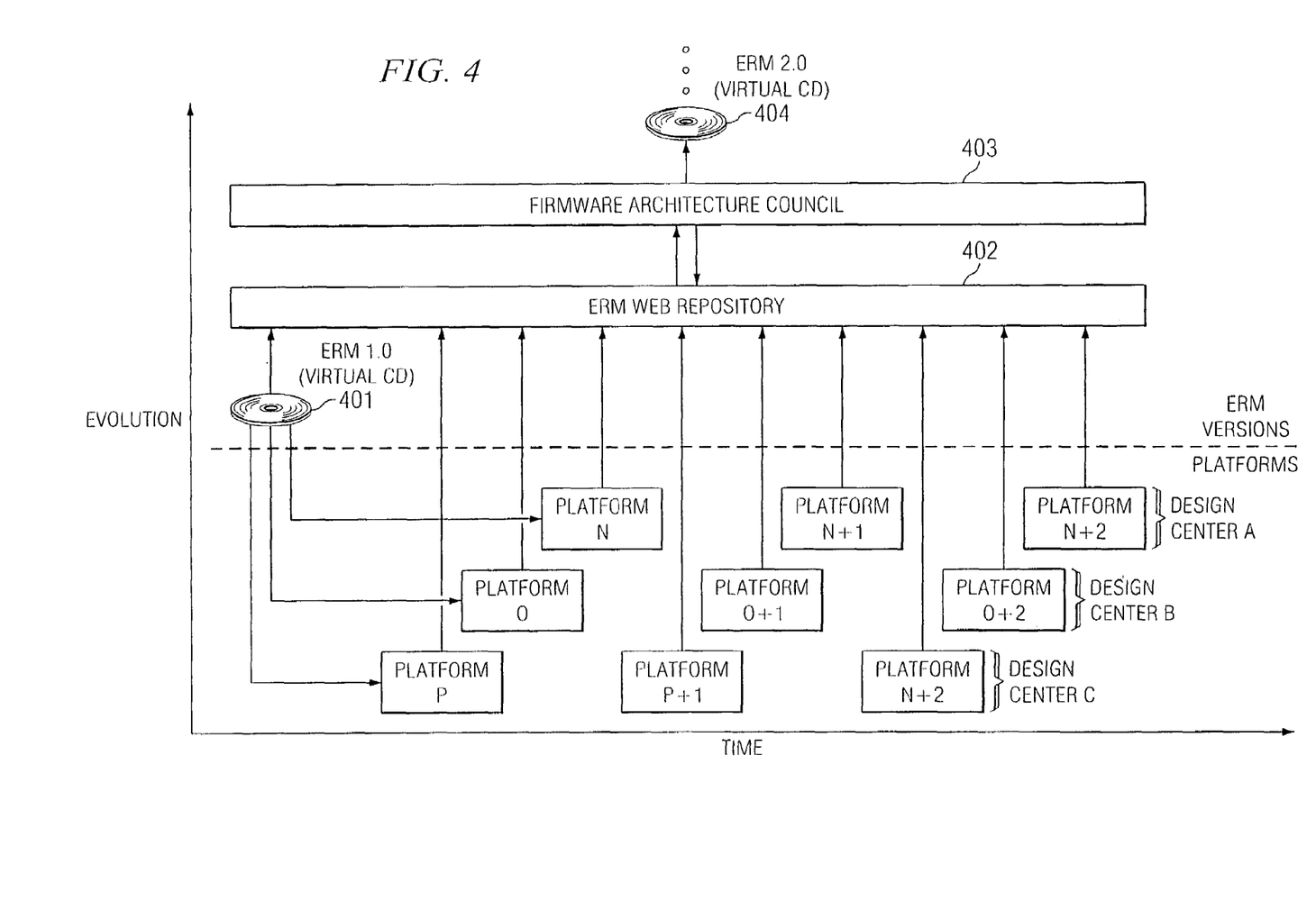
FIG. 4 shows an example of implementing one embodiment of the present invention for use across a plurality of different design centers.

An example of the context view of the ERM in accordance with one embodiment is shown in FIG. 4. FIG. 4 schematically shows platforms in three example design centers evolving over a series of products. More specifically, design centers A, B, and C are shown, which may correspond to a high-end server design center, workstation design center, and laptop computer design center, respectively, for example. Each design center develops products in accordance with a given platform over time. Each evolves upward over time. For instance, design center A develops products for platform "N", then platform "N+1", and then platform "N+2". Similarly, design center B develops products for platform "O", then platform "O+1", and then platform "O+2", and design center C develops products for platform "P", then platform "P+1", and then platform "P+2".

A snapshot of ERM contents is represented as a virtual CD 401. Each design center is free to draw from this repository to contribute to their actual products. In FIG. 4, arrows show withdrawals from the repository to the platforms. Any changes to the components can be made by design engineers to satisfy their individual business requirements. They are autonomous. If these changes are of general value (e.g., defect fixes are a definite case of general value), then the developer is free to redeposit the component source into the repository. This choice is also autonomous. Doing so helps to evolve the repository. The arrows from the platforms back into the repository 402, which is implemented such that it is communicatively accessible by members via a communication network (e.g., the Web) in this example, indicate such a deposit. Such deposits may comprise new topology diagrams (compositions of components that implement shipped firmware products) and documentation, tools, etc.

In certain embodiments of the present invention, membership in the firmware cooperative is voluntary but has costs. The member is expected to contribute resources to the work of the architectural council. The architectural council 403 is a group of members responsible for evolving the overall architecture (e.g., into a new version of the ERM, such as ERM 404 shown in the example of FIG. 4) and assisting deployment engineers through consulting, etc. The reuse of components within a product line is one dimension of reuse. We refer to this type of reuse, wherein components may be used across different product lines (i.e., by different development teams), as two-dimensional reuse.

As seen above in the ERM summary, process overlaps with architecture. Without a loosely coupled, component-based architecture, the ERM repository would be no different than any other shared source base. Reuse by copy and port would be the norm, as with traditional shared source bases. Collisions when merging functionality into a shared source tree would occur and limit evolution (just as occurs in every monolithic program). But there are other processes in an embodiment of the cooperative firmware architecture, such as the example Banyan model of FIG. 3, which are described further below:

Web-based collaboration. Explicit new work is done to facilitate collaboration and code reuse among geographically diverse teams. In this manner, travel expenses may be reduced while still maintaining a shared model of the Banyan architecture available through the web.

Product-Centric development. The Banyan architecture is a cooperative. Membership is voluntary. The architecture council does not prohibit any product team from doing what it deems appropriate. The presupposition is that each team knows its own product requirements better than any other team. Deployment engineers are free to violate the architecture or to extend the architecture for their local product centers. Management and control of deployment projects may be done as it traditionally is, with Project Managers, Section Managers, System Teams, etc. Business centers are autonomous. They control their own destinies. However, the teams may be capable of doing more work with fewer resources by joining the cooperative. This permits them to draw from the asset base and expects them to contribute their evolved components to it.

Autonomous Deployments. As the Banyan architecture evolves there is a structured lifecycle. One of the phases is validation. At a validation phase, deployment engineers may review architectural content and choose to deploy new architecture or to reuse previously developed components. The architecture lifecycle does not drive the deployment cycles. Deployment cycles are autonomous.

Annual or semi-annual conferences of all members. The most active learning processes involve frequent reviews while real work is in progress: to share what works and what doesn't work. Managers of cooperative members may sponsor regular conference meetings. The sponsor of the role of Cooperative Director (described further below) is expected to coordinate these conferences. Presentations and working sessions as in any professional conference are conducted. In this manner, the members all evolve and learn together. Regular face-to-face meetings of collaborating members help strengthen the social forces holding the cooperative together.

Consulting from Architectural Council members during deployment work. It is expected that the role of architect will usually be played by someone who will also spend time doing deployment. This is one of the best ways to ensure bi-directional learning occurs between architecture and implementation. During deployments, it is expected that the architecture will not be evolving rapidly. Therefore, the architects should have time to perform consulting work with other members.

Periodic formal revisions of the architecture. In the future, significant evolution of architecture may need to occur rapidly. With semi-annual or annual conferences of all Banyan Firmware Cooperative members, it will be easy to tell when this need arises. At this point, member sponsors (managers) should ensure they contribute sufficient resources to the architectural council work to make sure that evolution occurs in time for their program to benefit from it. Autonomy permits them not to make this contribution. However, as with all cooperatives, taking without giving back is socially discouraged.

Voluntary contribution to the asset base by deployment teams. It should be understood that without members contributing to the asset base, there will be no asset base. Further, without membership and contribution across different design centers, the asset base may achieve only one dimension of reuse.

Figure 5:
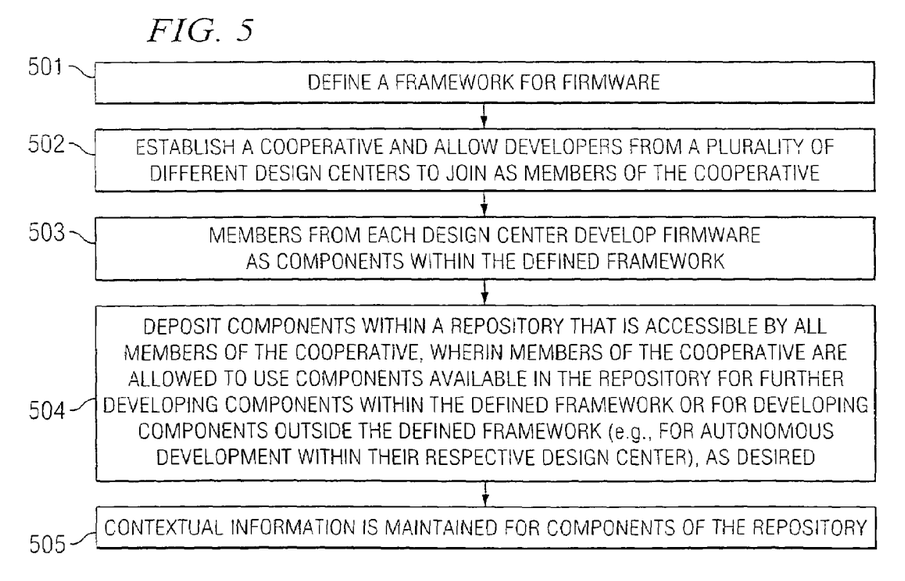
FIG. 5 shows an example operational flow diagram for developing firmware in accordance with one embodiment of the present invention.

An example operational flow diagram for developing firmware in accordance with one embodiment of the present invention is shown in FIG. 5. As shown, a framework for firmware is defined in operational block 501. Such framework may be any suitable framework with which firmware components are to comply, such as the IA-64 architectural framework as an example. In operational block 502, a cooperative is established and developers from a plurality of different design centers may be permitted to join the cooperative. In accordance with one embodiment, the managers and lead technologists meet, confer and agree to abide by the rules and processes of the cooperative ("co-op"). It is an informal agreement based on trust but also based on explicit understanding of the roles, responsibilities and rights of co-op membership. For other members to join the co-op once it is formed, one or more existing members of the co-op may have conversations with the prospects to determine whether they can agree to abide by the rules of the co-op. If they do, then they can seek free help from any Asset Leader to instantiate (host) a branch of the repository and begin development (by reusing) or by adding new assets to the co-op. This is a "distributed manage yourself" sort of social system, promoting business autonomy of each product development center.

For instance, developers from such design centers as a high-end server design center, workstation design center, personal computer design center, laptop design center, and handheld computer design center may be permitted to join the cooperative. Accordingly, developers that design firmware for different computer platforms may be members of the cooperative Thus, the co-op may have as its members developers creating firmware for one or more platforms. A "design center" may be geographically located and each geography "specializes" in a non-intersecting "design center" addressed by a particular hardware platform requiring a particular set of firmware capabilities according to a separated delivery schedule.

In accordance with embodiments of the present invention, members of the co-op may be granted open access (unrestricted) or controlled access (via User ID, Password, etc.) to all or a portion of the repository. For example, in one embodiment members are permitted normal computer user access, and access to the "Asset Lead" consultation through phone and email. Thus, the members are granted access to free consulting from those who can help them instantiate a repository and/or Banyan development host with compute resources owned by the new member/team. If a prospect wants to review the co-op, then the prospect may be granted login access and disk storage on an existing development host so they can try out the co-op and review the repository before committing to a full membership.

In operational block 503, members from each design center develop firmware as components within the defined framework. In operational block 504, the firmware components are deposited into a repository that is accessible by all members of the cooperative, wherein members of the cooperative are allowed to use the components available in the repository for further developing components within the defined framework or for developing firmware that does not comply with the defined framework (e.g., to autonomously develop firmware for their respective design center).

In certain embodiments, access to the repository is enabled by a) instantiating a Banyan co-op toolset in one or more development hosts (e.g., a timeshare unix server) at the member site and b) adding a user login to that machine. The Banyan login is used by some of the repository access tools. Some of the assets may be perused as HTML pages with simple Web access, also protected via web login ID, granted by the repository owner (a current member of the co-op). So, certain embodiments may have two levels of accesses: one for reading and one for actually using the assets in the repository. The using functionality may require more than a browser. For instance, it may require a Banyan build host and tools (programs and scripts) for extracting and using the assets in the repository.

In certain embodiments, members may be allowed to extract the assets of the repository via one of several use-scenarios. Such use-scenarios may metaphorically correspond to operations like "preview" (a book in a bookstore), "purchase (a copy of that book), "bind" (author a new manuscript and give it a title), and "publish" (publish an edition of the manuscript for others to preview or purchase), etc. Also, access is granted to consulting by existing co-op members. This consulting is free and sponsored by the provider's management, with the expectation that the new members will be eventually depositing assets of value back into the co-op repository and their product team will be able to reuse some of those shared assets.

In operational block 505, contextual information is maintained for the firmware components of the repository. As described above, such contextual information may identify the genealogy of the firmware components.

The example Banyan Firmware Cooperative is an informal organization. Autonomy is ensured because membership is voluntary and may be withdrawn at any time. It is expected that its members are the first line managers and their technical staffs of architects and design engineers of teams developing system firmware in platform development labs. It is also expected that the first line managers are the sponsors of membership since they control all the resources that contribute to the work of the cooperative.

An example of the Banyan Firmware Cooperative includes the following roles:

Banyan Director. This role organizes conference meetings and serves as final arbiter if the council becomes deadlocked as it performs its duties.

Architecture Council Member. The design engineer(s) sponsored by Cooperative PMs to participate in Banyan Architectural work.

Deployment Engineer. The people who create the work products that go into the Banyan asset base (the ERM). They are autonomous in that each development team of deployment engineers is free to use or not use the Banyan architecture in their lab's products. If they do draw from the repository, it is expected that they will give something back as with any cooperative.

Asset Lead. A role generally held by a senior deployment engineer in a cooperative member organization. This person is the gatekeeper that holds entropy at bay. The Asset Lead is responsible for ensuring that deposits into the repository make sense. That is, this is the individual who owns the authority to say no to any engineer in their team that wants to change the asset base in a way that will not improve the situation. Each lab is responsible for contributing an asset lead resource to the work of the cooperative, regardless if that lab also contributes architectural resources.

Deployment PM. By default, all PMs that sponsor membership of their team in the Banyan Cooperative are members. They really have no duties in the cooperative other than to ensure their team's members follow the rules of the cooperative. However, they do hive a responsibility to the cooperative, to help ensure its viability, by sponsoring the work to make deposits in the asset base, and the time engineers need to learn about and to help evolve the Banyan asset base by making deposits.

In view of the above, certain embodiments of the present invention provide methods and systems for developing firmware. In accordance with certain embodiments, a framework is defined for firmware to be developed by members of a cooperative. Developed firmware components and associated contextual information is stored to a repository, and members of the cooperative may access the repository to reuse the firmware components included therein. The members of the cooperative may, for instance, include developers from a plurality of different design centers. The cooperative allows members to each use firmware components available in the repository (e.g., in further developing firmware components needed in the member's respective design center), and it allows members to deposit firmware components that comply with the defined framework in the repository, along with contextual information for the component. While membership in the cooperative allows developers access to the repository, it does not prohibit developers from using components in the repository to autonomously develop components in a manner needed for their respective design center (e.g., in a manner that does not comply with the defined framework). Thus, the cooperative provides a social architecture that allows developers across different design centers to reuse firmware components (thus, enabling efficient developing of firmware), while permitting developers of different design centers to autonomously evolve reused firmware components as desired to meet the needs (e.g., time constraints for product development, etc.) of their respective design center.

What is claimed is:

1. A method for developing firmware, the method comprising:
   defining a framework for firmware to be developed by firmware developers at different design centers;
   at least one of said firmware developers developing firmware as at least one component within said framework; and
   depositing said at least one component within a repository that is accessible from all of said design centers, wherein said repository includes contextual information about said at least one component deposited therein and wherein said contextual information about said at least one component comprises genealogy information for said at least one component that specifies a developmental relationship between said at least one component and at least one other component in said repository.

2. The method of claim 1 wherein said framework comprises one selected from the group consisting of:
   an IA-32 architecture framework, an IA-64 architecture framework, a PA-RISC architecture framework, a MIPS architecture framework, a SPARC architecture framework, a 64-bit AMD OPTERON architecture, and an ALPHA architecture framework.

3. The method of claim 1 further comprising:
allowing said developers of said different design centers to join as members of a cooperative.

4. The method of claim 3 wherein said cooperative permits said members to access said at least one component deposited within said repository and use said at least one component for autonomous development of firmware within their respective design center.

5. The method of claim 3 wherein said cooperative permits each of said members access to said repository to retrieve said at least one component from said repository.

6. The method of claim 3 wherein said cooperative permits each of said members access to said repository to deposit one or more firmware components that comply with said framework.

7. The method of claim 1 wherein said different design centers comprise at least one selected from the group consisting of:
high-end server design center, workstation design center, personal computer design center, laptop computer design center, and handheld computer design center.

8. The method of claim 1 wherein said different design centers comprise design centers for different computer platforms.

9. The method of claim 1 wherein said contextual information further comprises at least one selected from the group consisting of:
(a) identification of at least one platform in which said at least one component has been deployed, (b) explanation of reasons said at least one component evolved, (c) explanation of problems and solutions for evolution of said at least one component, (d) references to inventions that said at least one component embodies, (e) indication of a health factor of said at least one component, (f) process recipes for how to test or validate said at least one component as a unit or within a system, and (g) identification of one or more authors or reusers of said at least one component.

10. The method of claim 1 wherein if said at least one component was derived from another component in said repository, said contextual information about said at least one component comprises:
information identifying said another component in said repository from which said at least one component was derived.

11. A business method for development of firmware across a plurality of design centers, said business method comprising:
defining a framework for firmware to be developed at different design centers;
developing firmware as components within said framework at at least some of the design centers;
depositing said components within a repository that is accessible by all of said design centers, wherein said repository includes contextual information about said components deposited therein and wherein said contextual information about said components comprises genealogy information for said components that specifies a developmental relationship between said components in said repository.

12. The business method of claim 11 further comprising:
allowing firmware developers of said different design centers to join as members of a cooperative, wherein said cooperative permits said members to access said components deposited within said repository and use said components for autonomous development of firmware within their respective design center.

13. The business method of claim 12 wherein said cooperative permits said members to use said components deposited within said repository for development of different platforms.

14. The business method of claim 12 wherein said cooperative permits said members to use said components deposited within said repository for development of firmware components that are not required to comply with the defined framework.

15. The business method of claim 11 wherein said framework comprises a general-purpose processor architectural framework.

16. The business method of claim 11 wherein said different design centers comprise at least one selected from the group consisting of:
high-end server design center, workstation design center, personal computer design center, laptop computer design center, and handheld computer design center.

17. The business method of claim 11 wherein said different design centers comprise design centers for different computer platforms.

18. A system comprising:
a plurality of different design centers communicatively coupled by a communication network to a repository, said repository accessible by firmware developers of the design centers; and
wherein said repository stores firmware components and contextual information for the firmware components and wherein said contextual information for the firmware components comprises genealogy information for said firmware components that specifies a developmental relationship between said firmware components in said repository.

19. The system of claim 18 further comprising:
a defined framework with which said firmware components comply.

20. The system of claim 18 wherein said repository permits said firmware developers to access said firmware components deposited therein and use said firmware components for autonomous development of firmware within their respective design center.

21. The system of claim 18 wherein said repository permits each of said firmware developers access thereto to deposit one or more firmware components that comply with a defined framework.

22. The system of claim 18 wherein said repository is distributed across the plurality of different design centers such that each design center has access to a local image of the firmware components and contextual information stored in the repository.

* * * * *

UNITED STATES PATENT AND TRADEMARK OFFICE
CERTIFICATE OF CORRECTION

PATENT NO. : 7,188,331 B2  Page 1 of 1
APPLICATION NO. : 10/684985
DATED : March 6, 2007
INVENTOR(S) : Bradley G. Culter It is certified that error appears in the above-identified patent and that said Letters Patent is hereby corrected as shown below:

On the face page, in field (54), in "Title", in column 1, line 3, after "DEPOSITING" insert -- FIRMWARE --.

In column 1, line 3, after "DEPOSITING" insert -- FIRMWARE --.

In column 4, line 6, delete "10" and insert -- 101 --, therefor.

In column 9, line 12, delete "en-or" and insert -- error --, therefor.

In column 11, line 6, delete "technology" and insert -- terminology --, therefor.

In column 16, line 11, delete "hive" and insert -- have --, therefor.

Signed and Sealed this

Twenty-second Day of September, 2009

David J. Kappos
*Director of the United States Patent and Trademark Office*